US007665936B2

(12) United States Patent
Miebach

(10) Patent No.: US 7,665,936 B2
(45) Date of Patent: Feb. 23, 2010

(54) WOOD DRILL BIT

(75) Inventor: Jurgen Miebach, Lindlar (DE)

(73) Assignee: Horst Miebach GmbH, Lindlar (DE)

(*) Notice: Subject to any disclaimer, the term of this patent is extended or adjusted under 35 U.S.C. 154(b) by 127 days.

(21) Appl. No.: 11/843,925

(22) Filed: Aug. 23, 2007

(65) Prior Publication Data

US 2008/0050190 A1 Feb. 28, 2008

(30) Foreign Application Priority Data

Aug. 23, 2006 (DE) ...................... 10 2006 039 426

(51) Int. Cl.
*B23B 51/00* (2006.01)

(52) U.S. Cl. ...................... 408/227; 408/212; 408/213; 408/225

(58) Field of Classification Search ................. 408/144, 408/211-214, 224-225, 227, 229, 230
See application file for complete search history.

(56) References Cited

U.S. PATENT DOCUMENTS 248,854 A * 11/1881 Gladwin ..................... 408/214
778,845 A * 1/1905 Cox ........................... 408/214
1,185,380 A * 5/1916 Davis ......................... 408/205
2,193,186 A * 3/1940 Bannister .................... 408/223
2,358,077 A * 9/1944 Koett ......................... 408/213
2,613,710 A * 10/1952 Emmons ..................... 408/213
3,064,699 A * 11/1962 Gleason ...................... 408/212
5,975,814 A * 11/1999 Pomp ......................... 408/225
6,354,774 B1 * 3/2002 Haughton et al. ........... 408/225
6,394,714 B2 * 5/2002 Eberhard .................... 408/211
6,443,674 B1 * 9/2002 Jaconi ........................ 408/1 R
2007/0172325 A1 * 7/2007 Ebert ......................... 408/227

FOREIGN PATENT DOCUMENTS

DE 159977 4/1983
DE 3316193 A1 * 11/1984
DE 29911945 U1 * 10/1999
FR 2540424 A1 * 8/1984
FR 2617753 A1 * 1/1989

OTHER PUBLICATIONS

German Examination Report dated Apr. 2, 2007, received in corresponding priority Application No. DE 10 2006 039 426.7, 2 pgs.

* cited by examiner

*Primary Examiner*—Daniel W Howell
(74) *Attorney, Agent, or Firm*—Grossman Tucker Perreault & Pfleger, PLLC

(57) ABSTRACT

The invention concerns a wood drill bit with a cylindrical drilling head. The drilling head has at its end a centering tip which is disposed on the longitudinal axis of the drill bit and which projects in the drilling direction for centering the wood drill bit, at least two main cutters which are arranged diametrically and radially or substantially radially and have main cutting edges, and a pan-cylindrical guide bell. Adjoining each main cutter is a chip ejection space which is partially open towards the connecting portion. It is proposed inter alia that the main cutter extends with a radially inwardly disposed portion into the centering tip and the chip ejection space is enlarged into the centering tip by means of a pre-chip ejection groove.

20 Claims, 10 Drawing Sheets

1
2
3
4
5
6
7
8
12
18
20
21
B
b
d
l

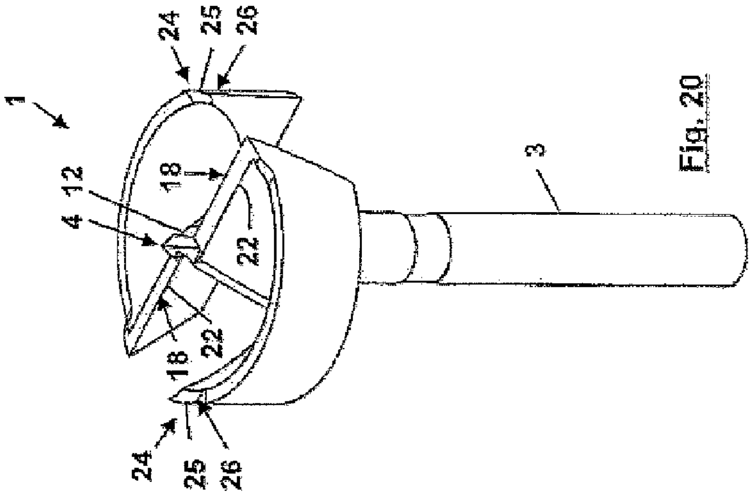
Fig. 20
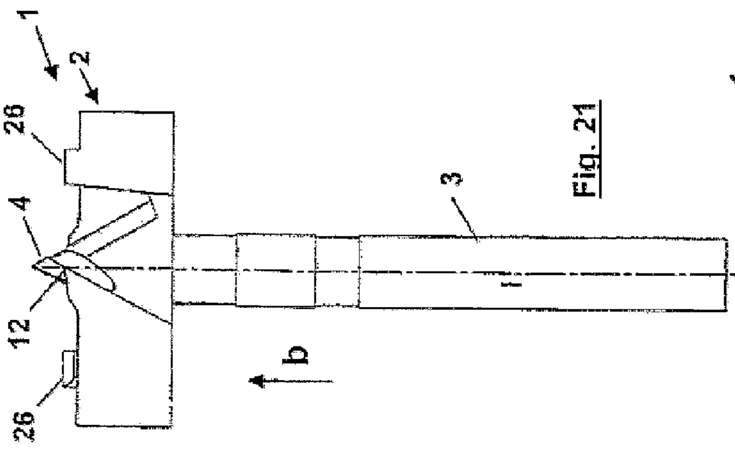
Fig. 21
Fig. 22
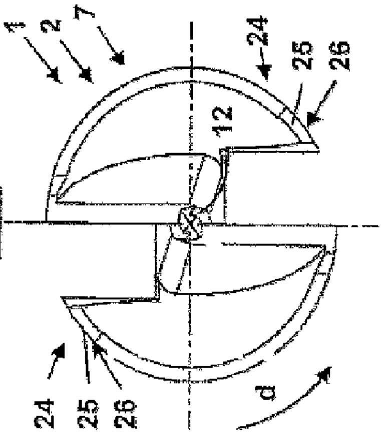

1
2
3
4
5
6
7
8
12
18
20
21
26
D
b
d
l

WOOD DRILL BIT

The invention concerns a wood drill bit with a cylindrical drilling head and a connecting portion adjoining the drilling head in opposite relationship to the drilling direction for connection to a drive means, wherein the drilling head has at its end a centering tip which is disposed on the longitudinal axis of the drill and which projects in the drilling direction for centering the wood drill bit, at least two main cutters which are arranged diametrically and radially or substantially radially and have main cutting edges, and a part-cylindrical guide bell and adjoining each main cutter is a chip ejection space which is partially open towards the connecting portion.

Wood drill bits of that kind, which are generally known as Forstner drill bits, are designed in particular for drilled holes of large diameters, such as for example for cupboard hinges. The amount of material to be cut away, which is comparatively large as a result, easily gives rise to the generation of a high level of heat in the drilled hole which, amplified when a high feed speed is involved, easily results in charring of material in the bottom of the hole, requires frequent re-sharpening of the cutting edges and ultimately reduces the operating lives of a wood drill bit of that kind. In addition it is necessary to manage a large amount of wood chips and this contributes to an increased drilling pressure in the drilled hole, which in turn can cause an increase in temperature with the above-indicated risks, and in addition increases the risk of easily chipping off wood at a side face of material being drilled, that is remote from the entry side when producing through holes or blind holes. That in turn allows only low feed speeds when performing drilling operations.

For that purpose, DE 299 11 945 U1 puts forward the proposal of breaking the chips over their width by grooves which are formed in the main cutters and which interrupt the main cutting edges, in order thereby to produce narrower wood chips which are easier to transport away, which represents a certain advance in terms of resolving the problem involved.

Therefore the object of the invention is to provide a wood drill bit of the kind set forth in the opening part of this specification, which permits an increased feed speed without its operating lives being reduced at the same time.

According to the invention that object is attained in that the main cutter extends with a radially inwardly disposed portion into the centering tip and the chip ejection space is enlarged into the centering tip by means of a pre-chip ejection groove.

In that case the pre-chip ejection groove is preferably disposed downstream of the respective main cutting edge which has the respective portion, in a direction of drilling rotation. The pre-chip ejection groove can be ground into the centering tip in one working operation together with the portion. In that way the cutting action can be implemented into the centering tip. As mentioned above, when drilling inter alia through resistant material, a drilling pressure can be built up at the bottom of a drilled hole, which can be increased by the material which has been cut away being accumulated or backing up. As a result an increased pressure on the wood drill bit in the drilling direction is necessary to produce the feed, whereby the temperature in the drilled hole can be further increased. Both these factors can increase the amount of wear of the drilling head, necessitate premature re-grinding of the main cutter and thus reduce the service life of the wood drill bit. In addition the risk of the wood splitting away at an exit side of the drilled hole, that is to say a side surface of the drilled hole which is at the rear in the drilling direction, can be increased. As a result material which accumulates at the centering tip when using conventional wood drill bits in the feed procedure can be partially cut away, whereby the drilling pressure is reduced. Furthermore the pressure can be further reduced by the pre-chip ejection groove by virtue of the material being cut away, insofar as the groove enlarges the chip ejection space into which it opens, and insofar as the material can be more easily transported away. Furthermore the area of the centering tip in perpendicular relationship to the drilling direction is reduced, whereby a force which contributes to determining the drilling pressure and with which the centering tip has to be pressed into the material which is still to be cut away in the bottom of the drilled hole in the drilling operation is reduced. The measure according to the invention completely attains the specified object.

Preferably the main cutter extends to close to a drill bit longitudinal axis of the drilling head or to the drill bit longitudinal axis or is extended by a small amount beyond the drill bit longitudinal axis. In that case the main cutter with said portion can be extended at a maximum as far as the side wall or side wall portion of the centering tip, which is beyond the drill bit center in a prolongation of the main cutting edge.

The main cutter can form in the portion a side face in the centering tip, which faces radially outwardly and axially in opposite relationship to the drilling direction. In that way the main cutters can each extend into the centering tip, forming an undercut configuration, and can acquire a cutting action and by virtue of the simultaneous provision of the pre-chip ejection groove, can increase the respectively adjoining chip ejection space into the centering tip. The orientation of the undercut configuration provides that with the rotation of the wood drill bit the centering tip can twist itself virtually in a spiral configuration into the material at the bottom of the drilled hole or can exert a feed force on the wood drill bit in the drilling direction, whereby a necessary external drilling force can be reduced.

In a preferred development of the wood drill bit the chip ejection space adjoining a respective main cutter can be enlarged into the centering tip. In that case allocated to the chip ejection space is also a space which in the drilled hole is delimited by the bottom of the drilled hole and the respective relief surface following a main cutter. Accordingly, by virtue of this measure according to the invention, the relief space behind the main cutters can extend into the centering tip so that the wood chips can already be guided away here into the chip ejection space. In that way once again the drilling pressure can be reduced so that just by virtue thereof the object of the invention can be completely attained. In that respect it is possible to attain an enlargement in part or completely by way of a radially inward enlargement of a relief surface following the respective main cutter.

Preferably the centering tip is of a pyramidal configuration with a base in parallelogram form, wherein sides of the base include an acute first angle and an obtuse second angle and the main cutters are respectively arranged to extend into a region of the centering tip with the acute angle in the base. In that way a free space which is associated with a main cutter and thus the chip ejection space can be enlarged. It is possible for chips which are cut off in the portion of the main cutter in the centering tip to be more easily guided away into the chip ejection space. The consequence of that is in turn that friction and temperature at the bottom of the drilled hole as well as the drilling pressure can be reduced in comparison with a conventional wood drill bit configuration and thus higher feed times and/or service lives are possible so that the object can be attained thereby.

On the geometrical premise that both angles are 180 degrees, the first angle can be between 55 degrees and 85 degrees and the second angle can be between 95 degrees and 125 degrees. Preferably the first angle is between 60 degrees and 80 degrees and the second angle is between 100 degrees and 120 degrees. As an optimum the first angle is 70 degrees and the second angle is 110 degrees. Tests have admittedly shown that here an optimum with the drill bit geometries involved can be achieved with 70° for the first angle and 110° for the second angle. It will be appreciated that it is possible that other angle values can be found to be optimum, with modified drill bit geometries. The diagonals of the base are preferably in mutually perpendicular relationship. That can be afforded if an originally square centering tip is laterally ground away in order to produce the centering tip according to the invention, as will be described in further detail hereinafter.

Preferably the first sides of the base extend approximately in the direction of the main cutters and the second sides of the base extend approximately perpendicularly or perpendicularly to the main cutters. Preferably the first sides are shorter than the second sides. In that respect the first sides and the second sides of the base denote the sides of the centering tip which are notionally afforded from the pyramidal centering tip with a parallelogram as the base and which have not yet been notionally shortened by the portion of the main cutters, which projects into the centering tip. Accordingly a conventional square centering tip can be reduced in its extent in perpendicular relationship to the main cutter so that as a result the main cutters extend further towards the drill bit longitudinal axis and can work freely. Furthermore a lateral flattening of the centering tip, which is effected thereby, can provide that the free space is increased in size in the region of the lateral flattening whereby chips which have been cut away have more available space and can thus reduce the drilling pressure at the bottom of the drilled hole.

The wood drill bit can additionally or solely have a chip divider device for dividing and/or breaking off chips which are to be cut away or which have been cut away by the main cutters in respect of their width over the longitudinal extent of the main cutters, wherein the chip divider device is preferably operative over the radial extent of at least one of the main cutters. In that way the chips can be divided at least once in respect of their chip width at least one of the main cutters over the radial extent thereof so that the chip width of individual chips can be correspondingly reduced. In that way the chips in question can be transported into the chip ejection space in opposite relationship to the drilling direction or the feed direction more easily, and further transported toward the connection portion. The specified object can be completely attained by that feature.

In a development of the wood drill bit at least one of the main cutters can be provided with at least one peak or tip projecting in the drilling direction. In that case the tip can be arranged disposed radially outwardly whereby, similarly to the pre-cutter referred to in greater detail hereinafter, it can cut an outer peripheral circle into the material which is to be cut away. Preferably however the tip is arranged spaced radially inwardly from the outer periphery of the drilling head. That projecting and thus leading tip can thus implement division of the material before the chip is cut away from the bottom of the drilled hole and thereby definedly reduce the chip width. By virtue of that measure the chips which are reduced in respect of their width can be more easily guided away into the chip ejection space and further towards the connecting portion so that this alone can attain the specified object.

The main cutters in respect of their longitudinal cross-sections can be of a curved profile, similarly to the configuration of a usual cycloid, with in each case at least one wave trough which trails or which is at the front in the drilling direction and/or at least one peak which leads or is at the rear in the drilling direction. A usual cycloid is the curve defined by a point rolling on an outer peripheral circle of a wheel and affords a succession of wave troughs which adjoin each other laterally converging to peaks. The profile can be ground into the main cutter for example by a suitably profiled grinding stone. If the tip is arranged radially outwardly or inwardly it can be incomplete as then it laterally delimits only one wave trough. In the region of the wave trough the chip can be cut away from the bottom of the drilled hole while the tip can implement division of the chip whereby the specified object can be completely attained. Preferably the wave troughs are of a respectively symmetrical configuration so that the main cutting edge extends in the radial center of a wave trough in perpendicular relationship to the drilling direction or in a cross-sectional plane of the drilling head and otherwise inclinedly and in leading relationship thereto. By virtue of the curved profile the main cutting edge can correspondingly cut inclinedly into the material in the bottom of the drilled hole and can thereby effectively operate in portion-wise manner in part like a saw. Other profile shapes are also possible such as for example a sawtooth or a wave profile of a configuration similar to a sine curve. The profile can also be similar to that of a toothed spatula, wherein the projecting "teeth" have a cutting edge and the "teeth" of both main cutters are staggered with respect to the peripheral circles.

Preferably the one main cutter has a wave trough and/or a peak more than the other main cutter. It can further be provided that the wave trough and the peak of the one main cutter are so arranged on peripheral circles that the wave trough of the one main cutter is arranged in a peripheral circle region like the peak of the other main cutter and/or that the peak of the one main cutter is arranged in a peripheral circle region on the same peripheral circle region as the wave trough of the other main cutter. Accordingly a peak of the one main cutter can engage into the peripheral region of the wave trough of the other main cutter, and can therefore be "staggered", whereby the bottom of the drilled hole can be cut away in the form of chips over the entire longitudinal extent of both main cutters, the widths of the chips being reduced corresponding to the positioning of the peaks on the main cutters.

In order to achieve a uniformly minimal chip width the peak of the one main cutter is arranged on a peripheral circle, on which a central region or preferably the geometrical center of the wave trough associated therewith of the other main cutter is arranged. It will be appreciated that this also applies conversely with cyclic interchange of the terms. In that way the chip to be cut away can be divided centrally in its width.

In addition the main cutters can each have at least one groove for breaking away chips, which is spaced from the outer peripheral circle of the drilling head and extends approximately perpendicularly to the main cutting edge of the respective main cutter, and the groove interrupts the respective main cutting edge. For that purpose, in accordance with the state of the art referred to in the opening part of this specification, DE 299 11 945 U1 to which reference is directed here, the groove of the one main cutter can be arranged on a peripheral circle which is radially spaced relative to the circumcircle on which the groove of the other main cutter is arranged. Accordingly the grooves are arranged on different peripheral circles, like previously peaks or wave troughs, each implementing a chip breaking effect in the drilling operation. In that way the cutting of a chip by means of a main cutter is interrupted radially at a different location, from the cutting of a chip by means of the other main cutter. The side walls of the groove can each project by a slight amount beyond the associated main cutting edge and thus, axially leading, implement preliminary separation of the chip which is to be cut away.

Preferably the one groove is arranged on a circumcircle at a third of an outside radius of the wood drill bit and the other groove is arranged on two-thirds of the outside radius of the wood drill bit. Preferably, in an arrangement with a plurality of grooves on the respective main cutters, one groove of the one main cutter is arranged on the peripheral circle which is approximately equal or equal to the peripheral circle on which a center of a main cutter portion is arranged between two grooves of the other main cutter. Minimally for attaining the specified object it can be provided that only one of the main cutters has a groove while no groove is provided in respect of the other main cutter. In that way the chip is divided at the one main cutter and not divided at the other main cutter, which however already signifies an alleviation in terms of guiding away the chip volume which occurs.

As a usual measure, the guide bell can have at least two part-peripheral pre-cutters with pre-cutting edges. Advantageously however, in comparison with conventional pre-cutters, the pre-cutters can be set back axially with respect to the main cutters inoperatively in respect of pre-cutting except for a respective pre-cutting portion which is operative in respect of pre-cutting. The reduction in both pre-cutters to only one respective pre-cutting portion which is operative in respect of pre-cutting means that it is possible to effectively reduce friction which is generated in the drilling operation by the pre-cutters, and that completely attains the specified object. Furthermore grinding of the pre-cutter which is limited operatively in respect of pre-cutting to the pre-cutter portion can be facilitated.

Preferably the pre-cutting portion can be respectively arranged peripherally from the radially outer edge of the associated main cutter approximately by between a quarter and a third of the outer peripheral circle of the drilling head in opposite relationship to a direction of drilling rotation. Usually the guide bell of a Forstner drill has two peripheral openings, of which a respective one is arranged preceding a main cutter in the direction of drilling rotation, and which serve for tool engagement for producing the main cutters. In that respect it is preferably provided that the pre-cutter portion is arranged on the guide bell in such a way that it delimits the peripheral opening at the side in opposite relationship to the main cutter. Accordingly cutting by means of the pre-cutting edges is displaced with respect to the main cutters in the direction of drilling rotation so that the cutting forces to be applied for drilling a drilled hole are distributed uniformly over the end face of the drilling head and permit smoother drilling which counteracts tilting in the drilled hole. In addition grinding the pre-cutters or the pre-cutter portions can be facilitated. Preferably the guide bell, in accordance with the state of the art, is open radially outwardly in the peripheral region which in opposite relationship to the direction of drilling rotation is arranged between the pre-cutter portion and the following main cutter.

Preferably the pre-cutting portion narrows radially outwardly and/or axially in the drilling direction. That can achieve a mechanically stable base for the pre-cutting portion in relation to cutting forces which occur and at the same time a pre-cutting edge which is further reduced in size, whereby frictional forces which occur at the pre-cutting edge can be further reduced in the drilling procedure. As is generally usual the pre-cutting edge can be arranged at the outer peripheral circle of the drilling head. In a development of the pre-cutter or the pre-cutting portion the pre-cutting edge, in the direction of drilling rotation, can be designed to rise slightly axially in the drilling direction. By virtue of that arrangement the pre-cutter or the pre-cutting portion can gradually engage with a pre-cutting action with the pre-cutting edge into the material which is to be cut away in the bottom of the drilled hole, whereby frictional forces which occur can be further minimized. In addition the pre-cutting portion is more vigorously supported in the direction of the forces which load it in the pre-cutting situation. In that way the pre-cutting portion can be further reduced in respect of its peripheral cutting length, which once again permits a reduction in possible frictional forces in the cutting operation and completely attains the object involved.

The cutting head can be coated at least in the region of the centering tip, the main cutters and/or the side cutters with a wear-resistant layer of hard material, in particular with a titanium nitride layer, whereby its service life can be enhanced.

The present invention is described in greater detail hereinafter by means of a number of embodiments by way of example illustrated in the drawing in which.

Figures 6, 7, 8, 9:
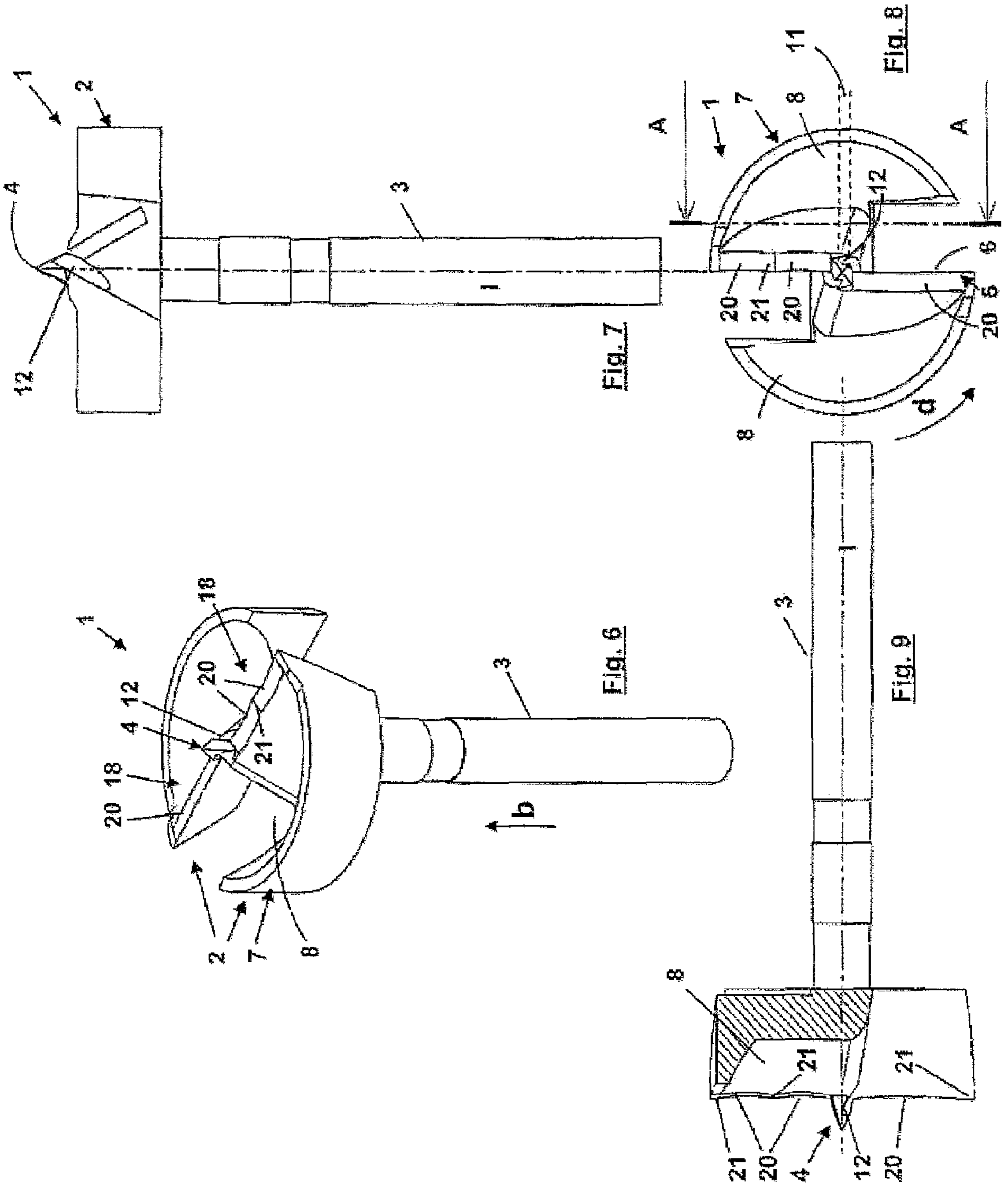
FIG. 6 shows a perspective view of a second embodiment of a wood drill bit.
FIG. 7 shows a side view of the wood drill bit of FIG. 6.
FIG. 8 shows a plan view of the wood drill bit of FIG. 6.
Figures 10, 11, 12, 13:
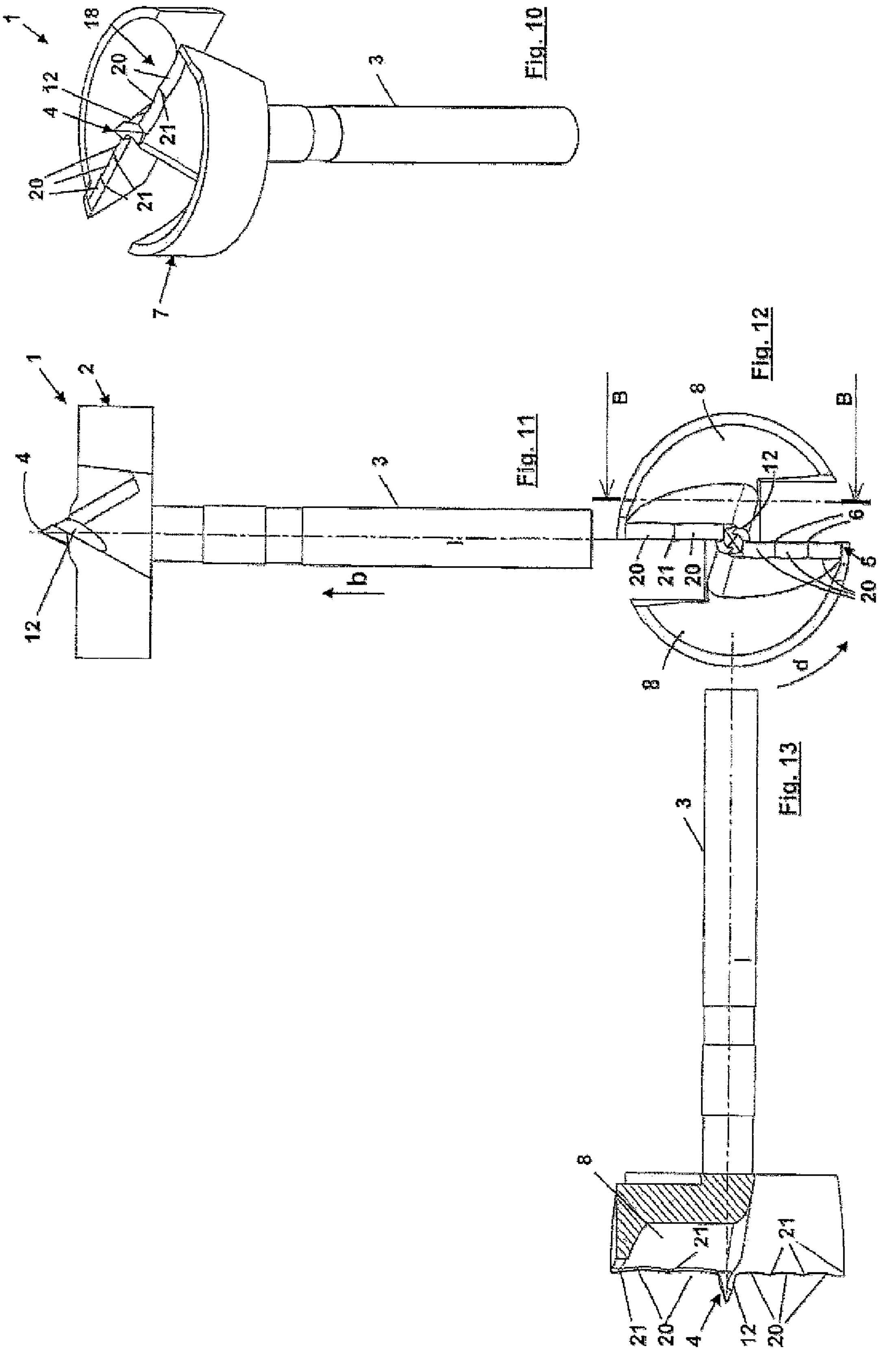
Figure 14:
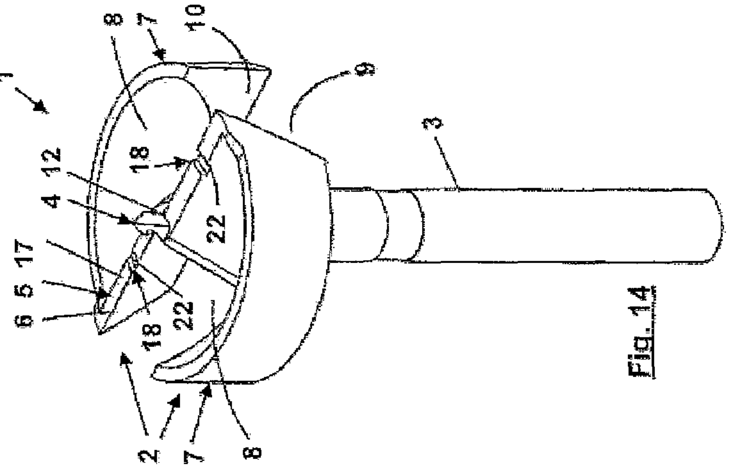
Figure 15:
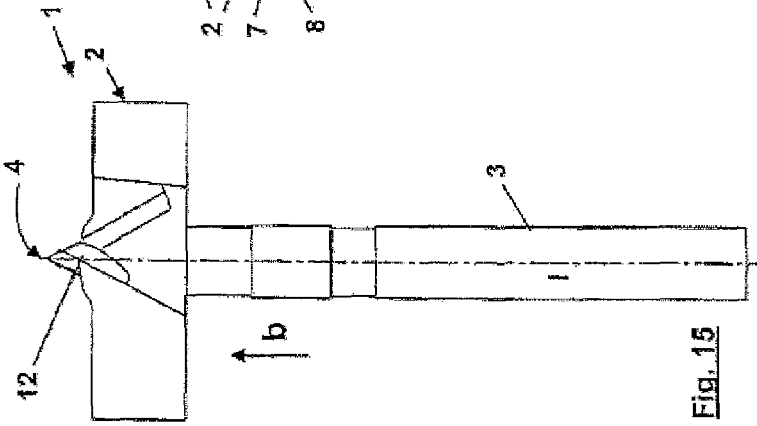
Figure 16:
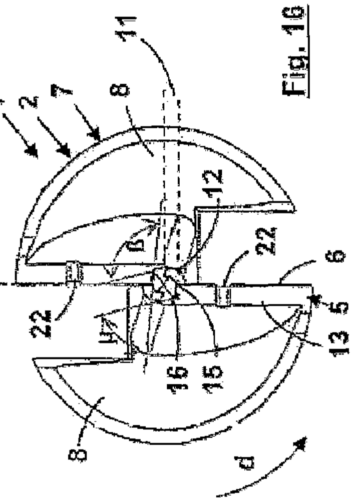
Figure 17:
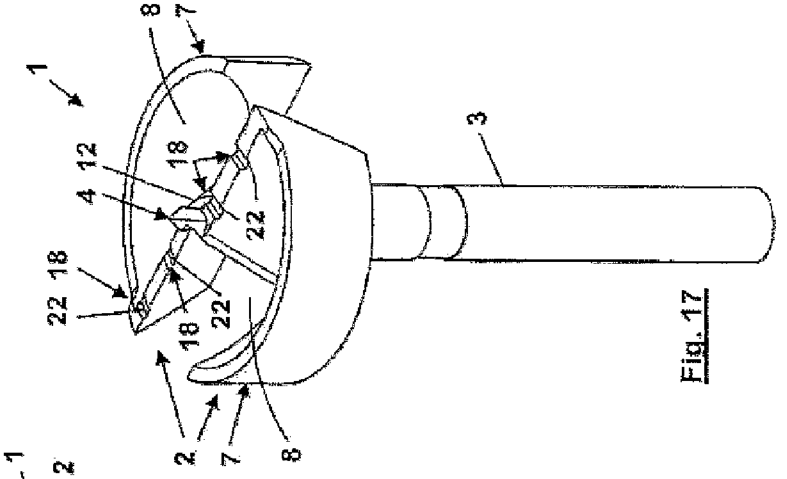
Figure 18:
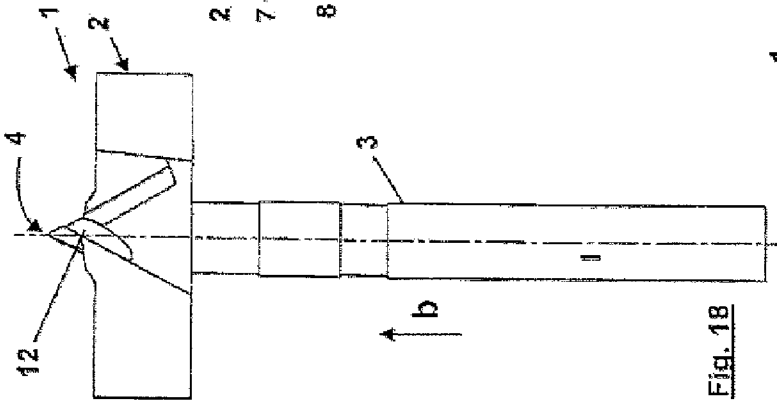
Figure 19:
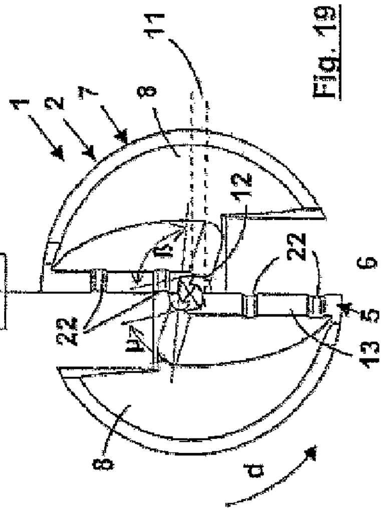
Figures 23, 24, 25, 26:
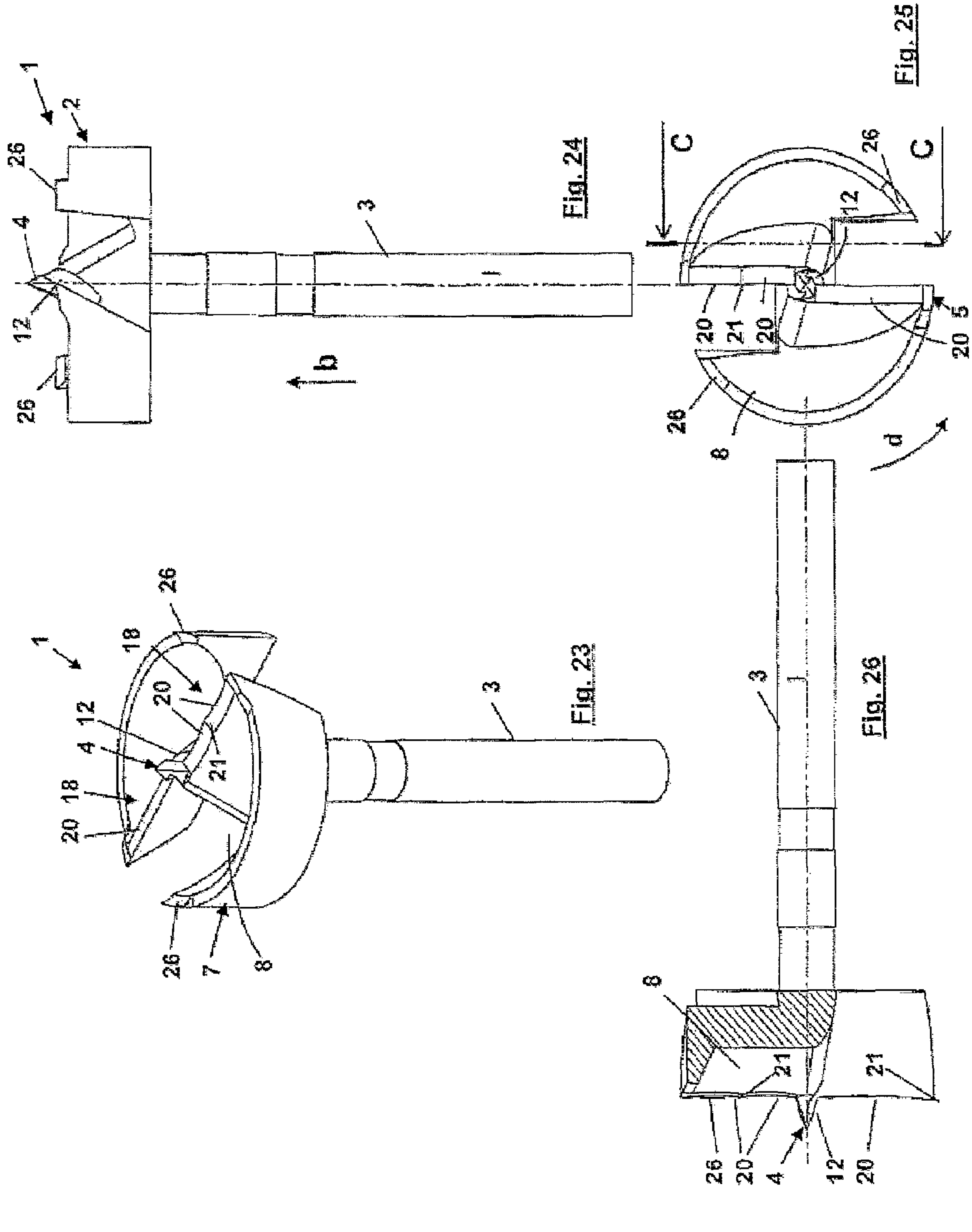
Figures 27, 28, 29, 30:
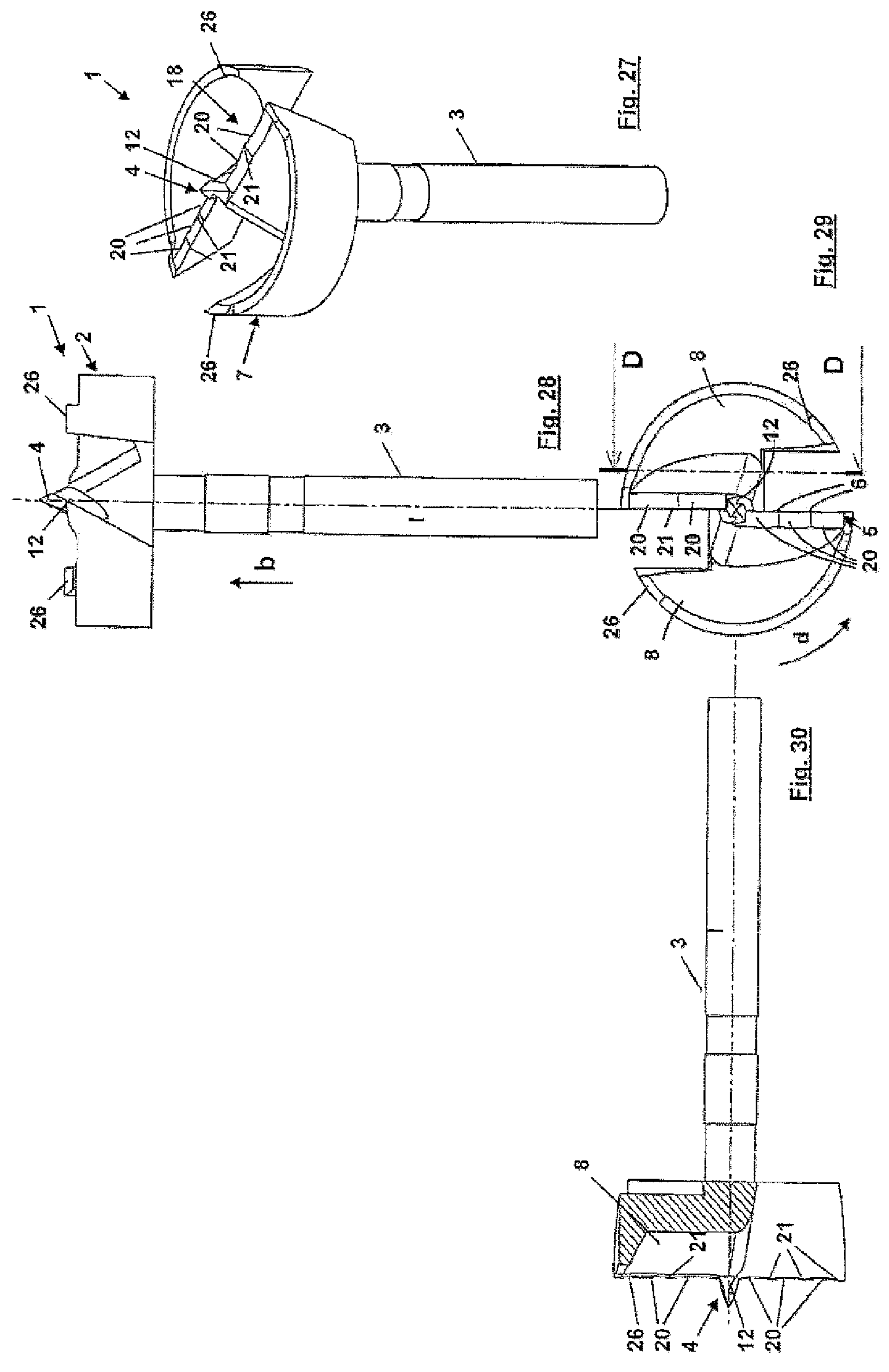
Figure 31:
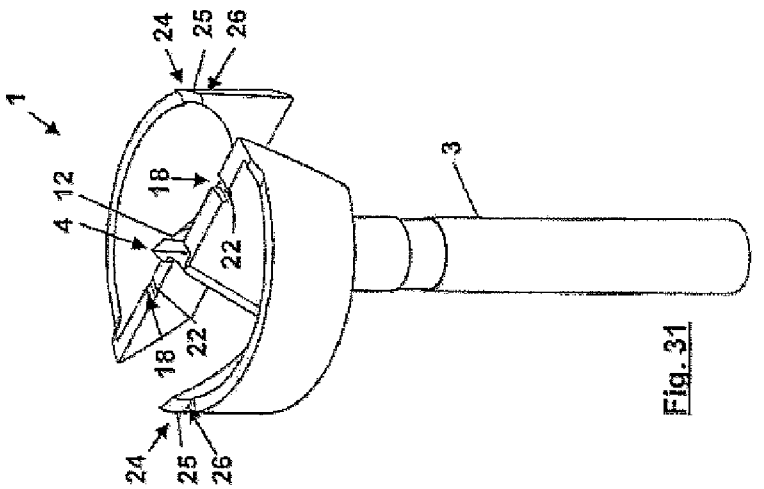
Figure 32:
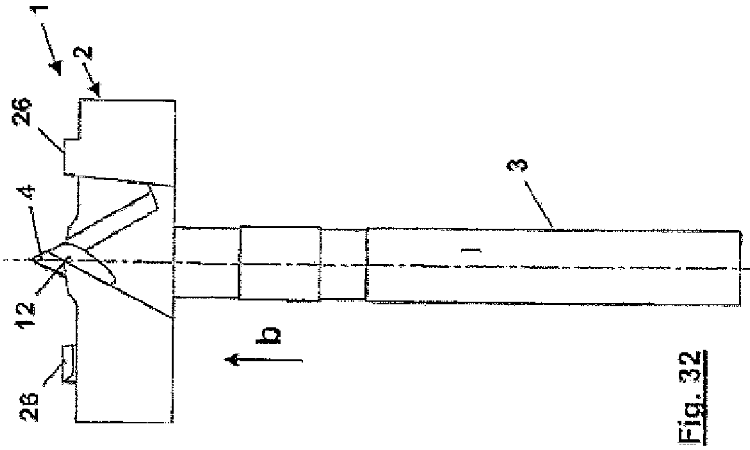
Figure 33:
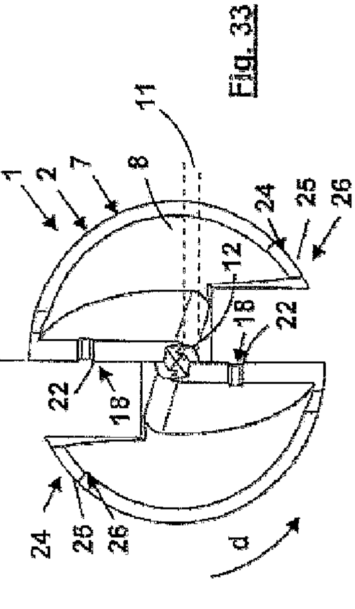
Figure 34:
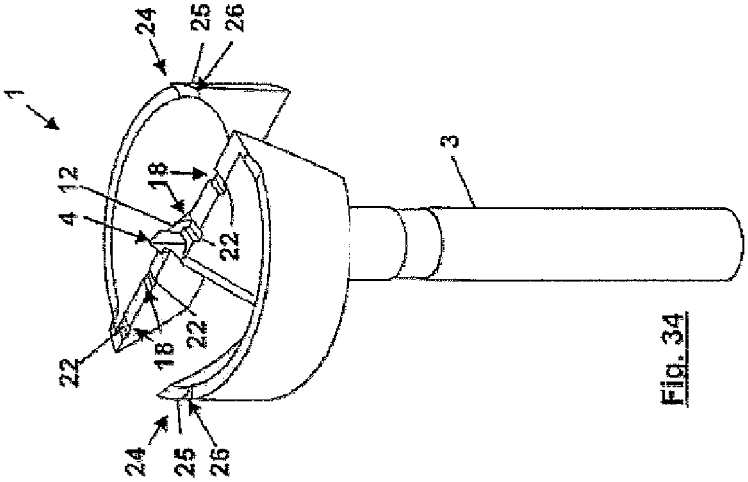
Figure 35:
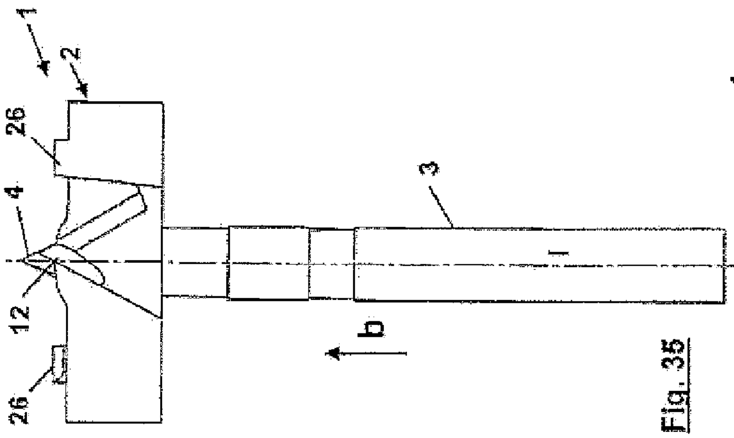
Figure 36:
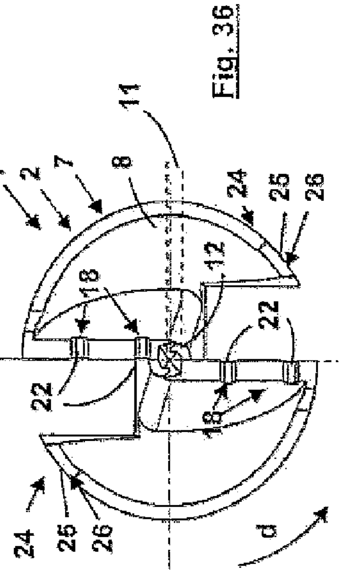

FIG. 9 shows a configuration in longitudinal section A-A shown in FIG. 8, FIG. 10 shows a perspective view of a third embodiment of a wood drill bit, FIG. 11 shows a side view of the wood drill bit of FIG. 10, FIG. 12 shows a plan view of the wood drill bit of FIG. 10, FIG. 13 shows a configuration in longitudinal section B-B shown in FIG. 12, FIG. 14 shows a perspective view of a fourth embodiment of a wood drill bit, FIG. 15 shows a side view of the wood drill bit of FIG. 14, FIG. 16 shows a plan view of the wood drill bit of FIG. 14, FIG. 17 shows a perspective view of a fifth embodiment of a wood drill bit, FIG. 18 shows a side view of the wood drill bit of FIG. 17, FIG. 19 shows a plan view of the wood drill bit of FIG. 17, FIG. 20 shows a perspective view of a sixth embodiment of a wood drill bit, FIG. 21 shows a side view of the wood drill bit of FIG. 20, FIG. 22 shows a plan view of the wood drill bit of FIG. 20, FIG. 23 shows a perspective view of a seventh embodiment of a wood drill bit, FIG. 24 shows a side view of the wood drill bit of FIG. 23, FIG. 25 shows a plan view of the wood drill bit of FIG. 23, FIG. 26 shows a configuration in longitudinal section C-C shown in FIG. 25, FIG. 27 shows a perspective view of an eighth embodiment of a wood drill bit, FIG. 28 shows a side view of the wood drill bit of FIG. 27, FIG. 29 shows a plan view of the wood drill bit of FIG. 27, FIG. 30 shows a configuration in longitudinal section D-D shown in FIG. 29, FIG. 31 shows a perspective view of a ninth embodiment of a wood drill bit, FIG. 32 shows a side view of the wood drill bit of FIG. 31, FIG. 33 shows a plan view of the wood drill bit of FIG. 31, FIG. 34 shows a perspective view of a tenth embodiment of a wood drill bit, FIG. 35 shows a side view of the wood drill bit of FIG. 34, and FIG. 36 shows a plan view of the wood drill bit of FIG. 34.

Referring to FIGS. 1 through 36 a total of ten embodiments of a wood drill bit 1 are shown in various views and longitudinal sections. The wood drill bit 1 has a cylindrical drilling head 2 and a connecting portion 3 adjoining the drilling head 2 in opposite relationship to a drilling direction b, for connection to a drive means which is not shown here. At the end the drilling head 2 includes a centering tip 4 which is disposed on the longitudinal axis l of the drill bit and which projects in the drilling direction b. In addition the drilling head 2 has two diametrically and radially arranged main cutters 5 with main cutting edges 6 and a part-cylindrical guide bell 7 comprising two part-peripheral portions. In addition there are provided two chip ejection spaces 8 which are each partially circumscribed by a main cutter 5 and the part-cylindrical guide bell 7. The chip ejection space 8 is open towards the connecting portion 3 by way of a connecting opening 9 for discharge of the chips (not shown here) which have been cut away, and has a radially outwardly disposed, partial peripheral opening 10. The two openings 9, 10 serve at the same time as a tool access for producing the respective main cutter 5.

In accordance with the invention the main cutter 5 is respectively passed with a radially inwardly disposed portion 11 into the centering tip 4. In addition the chip ejection space 8 which is at the rear with respect to the portion 11 in the direction d of drilling rotation is respectively enlarged by a pre-chip ejection groove 12 which leads from the centering tip 4 into the chip ejection space 8. By virtue of those measures, the cutting action of the main cutter 5 is brought into the centering tip 4 and the chips which are not cut away here are additionally guided away from the main cutting edge 6 by way of the pre-chip ejection groove 12. In that way material which in the case of conventional wood drilling accumulates in the feed operation at the centering tip is cut away by means of the portion 11 and transported away by way of the pre-chip ejection groove 12, whereby an otherwise usual drilling pressure in a drilled hole (not shown here) is reduced. In the ten embodiments which are illustrated here the portion projects as far as the longitudinal axis l of the drilling head 2. In the portion 11 the main cutter 5 forms a side face 13 in the centering tip 4 which faces radially outwardly and axially in opposite relationship to the drilling direction b. Accordingly when the drilling head 2 cuts into the drilled hole that side face 13 exerts an additional force moment in the drilling direction b so that the wood drill bit 1 can be more easily driven forwardly.

As can be seen in particular from the plan views (FIGS. 3, 8, 12, 16, 19, 22, 25, 29, 33 and 36) the centering tip 4 is of a pyramidal shape with a base 14 which, without the portion 11 projecting into the centering tip 4, is in the form of a parallelogram with two different angles, a first angle $\mu$ of here 70 degrees and a second angle $\beta$ here of 110 degrees. As a result, the base 14 has a short first side 15 and a long second side 16, wherein the first side 15 is arranged approximately parallel to the main cutting edges 6 and the second side 16 is arranged approximately perpendicularly to the main cutting edges 6. By virtue of that measure, a free space around the centering tip 4 is increased in size and a surface is reduced, with which the centering tip 4 presses against the bottom of the drilled hole (not shown) and which in the plan views corresponds to the contour of the centering tip 4. In addition the chip ejection space 8 which follows a respective main cutting edge 6 is correspondingly enlarged with a relief surface 17 adjoining the main cutting edge 6.

Figures 1, 2, 3, 4, 5:
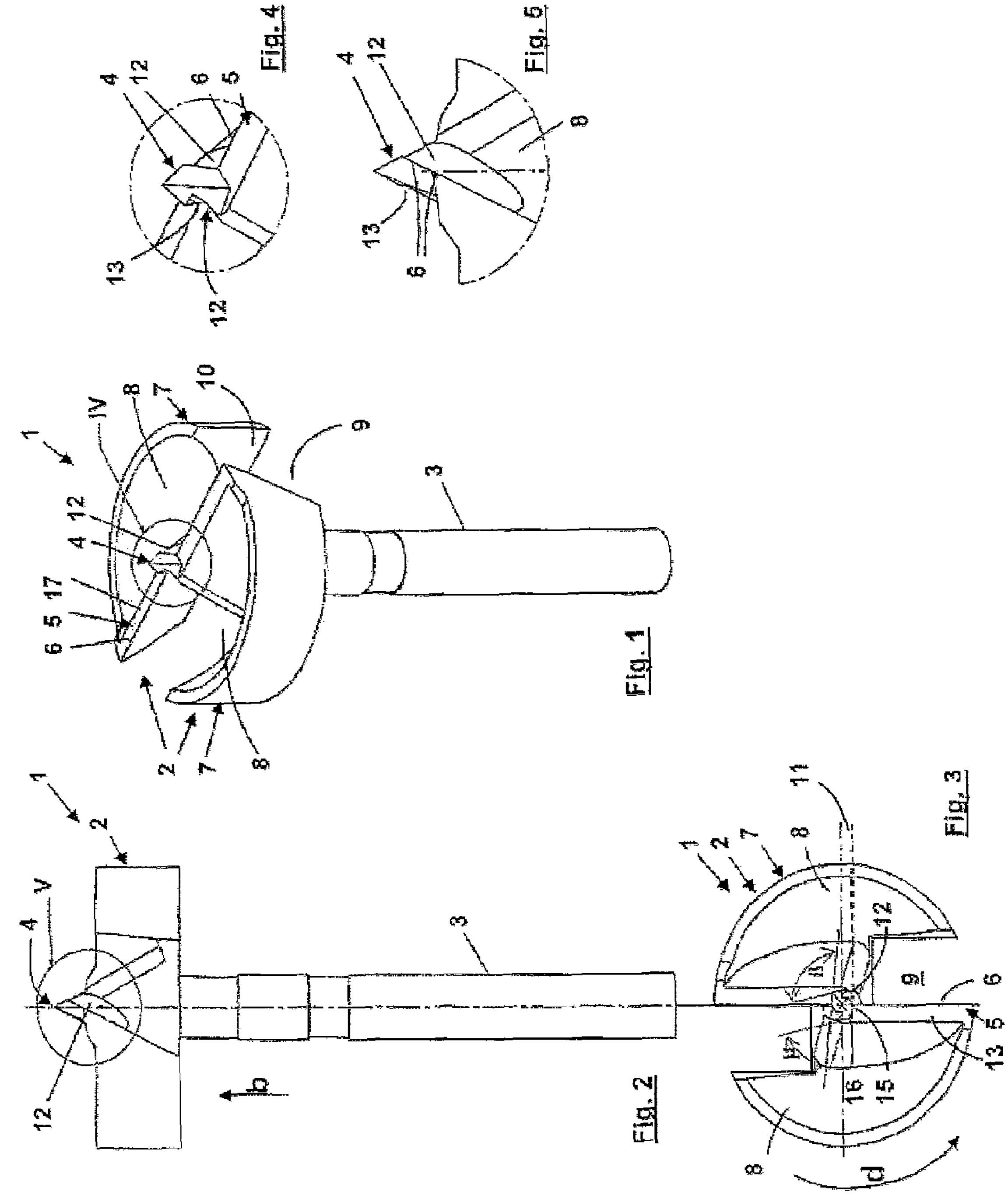
FIG. 1 shows a perspective view of a first embodiment of a wood drill bit.
FIG. 2 shows a side view of the wood drill bit of FIG. 1.
FIG. 3 shows a plan view of the wood drill bit of FIG. 1.
FIG. 4 shows a portion IV shown in FIG. 1.
FIG. 5 shows a portion V shown in FIG. 2.

In the first embodiment shown in FIGS. 1 through 5 the main cutting edges 6 are of a linear or straight configuration. The embodiments shown in FIGS. 6 through 9 and 10 through 13, as can be particularly clearly seen from the views in longitudinal section in FIGS. 9 and 13, have, as part of a chip divider device 18, a curved profile 19, similarly to that of a conventional cycloid, with wave troughs 20 which trail or which are at the front in the drilling direction b and peaks 21 which lead or are at the rear in the drilling direction b. In this respect, in the second embodiment, two wave troughs 19 and a central peak 21 are provided at the main cutter 5 which at the front in FIG. 6 while provided at the main cutter 5 which is at the rear in FIG. 2 is a wave trough 19 which extends over the entire main cutter 5. The leading central peak 21 provides that a chip (not shown here) which is to be cut off is cut into at the middle of its width and is divided with further cutting by the wave troughs 20 at that location. A chip is cut away over its entire width by the sole wave trough 20 on the main cutter 5 which is at the rear in FIG. 6. The sole wave trough 20 however permits the chip which is cut away by the main cutter 5 which is at the front in FIG. 6 to be divided in respect of its width. Accordingly the second embodiment represents the minimum number of wave troughs 20 and peaks 21 in the profile of the main cutters 5. A characteristic of the two profile shapes shown here is that one of the main cutters has one wave trough 19 more and one peak 21 more than the other main cutter 5. In that way a peak 21 which is formed from two wave troughs 20 can be staggered in relation to a wave trough 20 of the respective other main cutter 5.

The profile 19 of the third embodiment of the wood drill bit 1, shown in FIGS. 10 through 13, on the main cutter 5 which is at the front in FIG. 10, has two wave troughs 20 with a central peak 21 and, on the main cutter 5 which is at the rear in FIG. 10, a profile 19 with two wave troughs 20 which respectively come together on a third of the longitudinal extent of the main cutter 5 in front of a peak 21. Thus a chip which has been divided into two is cut away by the main cutter 5 which is at the front in FIG. 10 and a chip which is cut into three is cut away by the main cutter 5 which is at the rear in FIG. 10. The profile 19 is formed in each case in the main cutter 5 by means of a profiled grinding stone.

In the following two embodiments shown in FIGS. 14 through 16 and FIGS. 17 through 19 respectively the chip divider device 18 is of a profile 19 in which the linear main cutting edges 6 of the main cutters 5 are respectively interrupted by a groove 22 so that the chip (not shown here) which is to be cut away is broken at the groove 22 over its respective width. In this arrangement the grooves 22 are arranged in radially displaced relationship with each other so that the drilled hole bottom (not shown here) is cut over the complete longitudinal extent of the main cutting edge 6. The grooves 22 are desirably of a round cross-sectional profile and are produced in the main cutters 5 by being ground therein. FIGS. 17 through 19 show a fifth embodiment of the wood drill bit 1 in which the profile 19 of the main cutters 5 provides for each main cutter 5 two grooves 22 which again are arranged in radially displaced relationship with each other in such a way that one groove 22 of the one main cutter encounters a region 23 of the other main cutter between the grooves 22 thereof, in which the main cutting edge 6 is not interrupted.

In the sixth embodiment shown in FIGS. 20 through 22 the drilling head 2 has two part-peripheral pre-cutters 24 with pre-cutting edges 25 which in relation to the state of the art are respectively reduced to a pre-cutting portion 26 which projects operatively in pre-cutting implementation in the drilling direction b. The pre-cutting portion 26, with its pre-cutting edge 25 which is arranged at the outer periphery of the drilling head 2, cuts in pre-cutting mode into the drilled hole bottom (not shown here) and thereby permits clean separation of wood fibers (not shown) which go beyond the drilled hole and thus prevents the drilled hole from splitting away. By virtue of the respectively slight peripheral extent of the pre-cutting portions 26 friction is generated only to a slight degree in the drilling operation.

The pre-cutting portions 26 are respectively arranged displaced in opposite relationship to the direction d of drilling rotation peripherally from the radially outer edge of the main cutter 5 to which they are respectively connected by way of the guide bell 7, by approximately a third of the outer peripheral circle of the drilling head 2, and laterally delimit the peripheral opening 10. That makes it possible for its pre-cutting edge 25 to be more easily ground. In addition cutting forces and cutting moments which occur at the main cutters 5 and at the pre-cutters 24 or pre-cutting portions 26 are distributed more uniformly over the cross-section of the drilling head 2 so that more uniform drilling which has less of a tendency to tilting is now possible.

The four embodiments which now follow, that is to say the seventh embodiment through to the tenth embodiment, respectively represent combinations of the six embodiments shown in FIGS. 1 through 22. The combination of the features of the preceding embodiments correspondingly combines the advantages involved.

Thus the seventh embodiment shown in FIGS. 23 through 26 has the curved profile 19 in accordance with the second embodiment with wave troughs 20 and peaks 21 as well as the two pre-cutting portions 26 of the sixth embodiment.

In the eight embodiment of FIGS. 27 through 30 the features of the third embodiment are combined with the curved profile 19 and the features of the sixth embodiment with the pre-cutting portions.

The ninth embodiment of the wood drill bit 1 is provided in regard to the chip divider device 18 with the features of the fourth embodiment, in accordance with which each main cutting edge 6 is interrupted by a groove 22 for chip breaking purposes and in addition has the pre-cutting portions 26 of the sixth embodiment of the wood drill bit 1.

The tenth embodiment of the wood drill bit 1, which is shown in FIGS. 34 through 36, like the fifth embodiment of the wood drill bit 1 shown in FIGS. 17 through 19, has for each main cutter 5 two grooves 22 which are staggered in radially mutually spaced relationship. In addition the tenth embodiment is provided with the pre-cutting portions in accordance with the sixth embodiment shown in FIGS. 20 through 22.

Thus in its first through sixth embodiments with the main cutters 5, the wood drill bit 1 affords a cutting possibility which in the individual embodiments is improved in part in different ways by virtue of the main cutter 5 running into the centering tip 4, the fact of the main cutting edge 6 being interrupted by grooves 22 or by a wavy profile 19 with wave trough 20 and peak 21, in terms of an advantageous reduction in the drilling pressure involved in the hole being drilled. Furthermore, the pre-cutters 24 afford a second cutting option, wherein the reduction of the respective pre-cutter 24 to a pre-cutting portion 26 and the positioning of the pre-cutting portion 26 at the peripheral opening provide for minimizing frictional forces which occur in the cutting operation and afford more uniform distribution of cutting forces and moments.

LIST OF REFERENCES

1 wood drill bit
2 drilling head
3 connecting portion
4 centering tip
5 main cutter
6 main cutting edge
7 guide bell
8 chip ejection space
9 connecting opening
10 peripheral opening
11 portion
12 pre-chip ejection groove
13 side face
14 base
15 first side
16 second side
17 relief surface
18 chip divider device
19 profile
20 wave trough
21 peak
22 groove
23 region
24 pre-cutter
25 pre-cutting edge
26 pre-cutting portion
b drilling direction
l longitudinal axis of the drill bit
d direction of drilling rotation
μ first angle
β second angle

The invention claimed is:

1. A wood drill bit with a cylindrical drilling head and a connecting portion adjoining the head in opposite relationship to the drilling direction for connection to a drive means, wherein the drilling head has at its end a centering tip which is disposed on the longitudinal axis of the drill bit and which projects in the drilling direction for centering the wood bit, at least two main cutters which are arranged diametrically and radially or substantially radially and have main cutting edges, and a part-cylindrical guide bell, and adjoining each main cutter is a chip ejection space which is partially open towards the connecting portion, wherein at least one of said at least two main cutters extends with a radially inwardly disposed portion into the centering tip and the chip ejection space is enlarged into the centering tip by means of a pre-chip ejection groove, characterized in that at least one of said at least two main cutters forms in said radially inwardly disposed portion a side face in said centering tip which faces radially outwardly and axially in opposite relationship to the drilling direction.

2. A wood drill bit as set forth in claim 1 characterized in that the main cutter extends to close to a drill bit longitudinal axis of the drilling head or to the drill bit longitudinal axis or is extended by a small amount beyond the drill bit longitudinal axis.

3. A wood drill bit as set forth in claim 1 characterized in that the centering tip is of a pyramidal configuration with a base in parallelogram form, wherein sides of the base include an acute first angle and an obtuse second angle and the main cutters are respectively arranged to extend into a region of the centering tip with the first angle in the base.

4. A wood drill bit as set forth in claim 3 characterized in that the first angle is between 55 degrees and 85 degrees and the second angle is between 95 degrees and 125 degrees.

5. A wood drill bit as set forth in claim 3 characterized in that the first angle is between 60 degrees and 80 degrees and the second angle is between 100 degrees and 120 degrees.

6. A wood drill bit as set forth in claim 3 characterized in that the first angle is 70 degrees and the second angle is 110 degrees.

7. A wood drill bit as set forth in claim 3 characterized in that first sides of the base extend approximately in the direction of the main cutters and second sides of the base extend approximately perpendicularly to the main cutters, and the first sides are shorter than the second sides.

8. A wood drill bit as set forth in claim 1 characterized by a provided chip divider device for dividing and/or breaking off chips which are to be cut away or which have been cut away by the main cutters in respect of their width over the longitudinal extend of the main cutters, wherein the chip divider device is operative over the radial extent of least one of the main cutters.

9. A wood drill bit as set forth in claim 1 characterized in that at least one of the main cutters is provided with at least one tip projecting in the drilling direction.

10. A wood drill bit as set forth in claim 9 characterized in that the tip is arranged spaced radially inwardly from the outer periphery of the drilling head.

11. A wood drill bit as set forth in claim 9 characterized in that the main cutters in respect of their longitudinal cross-sections are of a curved profile, similarly to the configuration of a usual cycloid, with in each case at least one wave trough which trails or which is at the front in the drilling direction and/or at least one peak which leads or is at the rear in the drilling direction.

12. A wood drill bit as set forth in claim 11 characterized in that the one main cutter has a wave trough and/or a peak more than the other main cutter.

13. A wood drill bit as set forth in claim 11 characterized in that the peak of the one main cutter is arranged on a peripheral circle, on which a central region of the wave trough associated therewith of the other main cutter is arranged.

14. A wood drill bit as set forth in claim 8 characterized in that the main cutters each have at least one groove for breaking away chips, which is spaced from the outer peripheral circle of the drilling head and extends approximately perpendicularly to the main cutting edge of the respective main cutter, and the groove interrupts the respective main cutting edge.

15. A wood drill bit as set forth in claim 14 characterized in that the groove of the one main cutter is arranged on a peripheral circle which is radially spaced relative to the circumcircle on which the groove of the other main cutter is arranged.

16. A wood drill bit as set forth in claim 1 characterized in that the guide bell has at least two part-peripheral pre-cutters with pre-cutting edges and the pre-cutters are set back axially with respect to the main cutters inoperatively in respect of pre-cutting except for a respective pre-cutter portion which is operative in respect of pre-cutting.

17. A wood drill bit as set forth in claim 16 characterized in that the pre-cutting portion is respectively arranged peripherally from the radially outer edge of the associated main cutter approximately by between a quarter and a third of the outer peripheral circle of the drilling head in opposite relationship to a direction of drilling rotation.

18. A wood drill bit as set forth in claim 16 characterized in that the pre-cutter portion narrows radially outwardly and/or axially in the drilling direction and the pre-cutting edge is provided at the outer peripheral circle of the drilling head.

19. A wood drill bit as set forth in claim 16 characterized in that the pre-cutting edge of the pre-cutting portion in the direction of drilling rotation is adapted to rise slightly axially in the drilling direction.

20. A wood drill bit as set forth in claim 1 characterized in that the cutting head is coated with a wear-resistant layer of hard material, at least in the region of the centering tip, the main cutters and/or the side cutters.

* * * * *

UNITED STATES PATENT AND TRADEMARK OFFICE

CERTIFICATE OF CORRECTION

PATENT NO. : 7,665,936 B2

APPLICATION NO. : 11/843925

DATED : February 23, 2010

INVENTOR(S) : Jurgen Miebach

It is certified that error appears in the above-identified patent and that said Letters Patent is hereby corrected as shown below:

On the title page item (57), under "ABSTRACT" line 7, delete "pan-cylindrical" and insert -- part-cylindrical --, therefor.

In column 10, line 37, in claim 1, after "the" insert -- drilling --.

In column 10, line 41, in claim 1, after "wood" insert -- drill --.

In column 11, line 16, in claim 8, delete "extend" and insert -- extent --, therefor.

In column 11, line 17, in claim 8, after "of" insert -- at --.

Signed and Sealed this

Sixth Day of July, 2010

David J. Kappos

*Director of the United States Patent and Trademark Office*